(12) United States Patent
Dreher et al.

(10) Patent No.: US 7,526,919 B2
(45) Date of Patent: May 5, 2009

(54) DRIVE SYSTEM HAVING A COMMON CONTROL-PRESSURE CONNECTION

(75) Inventors: Herbert Dreher, Horb (DE); Clemens Krebs, Tübingen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 368 days.

(21) Appl. No.: 10/592,210

(22) PCT Filed: Mar. 4, 2005

(86) PCT No.: PCT/EP2005/002309

§ 371 (c)(1),
(2), (4) Date: Sep. 8, 2006

(87) PCT Pub. No.: WO2005/087528

PCT Pub. Date: Sep. 22, 2005

(65) Prior Publication Data

US 2008/0229739 A1    Sep. 25, 2008

(30) Foreign Application Priority Data

Mar. 9, 2004   (DE) .................. 10 2004 011 423
Sep. 10, 2004  (DE) .................. 10 2004 043 897

(51) Int. Cl.
*B60K 6/12*    (2006.01)
*F16H 61/00*   (2006.01)

(52) U.S. Cl. ........................... 60/437; 60/435

(58) Field of Classification Search ............ 60/434, 60/435, 436, 437
See application file for complete search history.

(56) References Cited

U.S. PATENT DOCUMENTS

| | | | |
|---|---|---|---|
| 4,170,153 A | 10/1979 | Mizuno et al. | |
| 4,215,545 A | 8/1980 | Morello et al. | |
| 4,387,783 A * | 6/1983 | Carmen | 60/437 |
| 4,621,495 A | 11/1986 | Hedlund | |
| 5,425,238 A | 6/1995 | Takagi | |

FOREIGN PATENT DOCUMENTS

WO    WO 03/046380 A1    6/2003

* cited by examiner

*Primary Examiner*—Thomas E Lazo
(74) *Attorney, Agent, or Firm*—Scully, Scott, Murphy & Presser, P.C.

(57) ABSTRACT

The invention relates to a drive system (1) having a first driving shaft (2) and having a second driving shaft (3). The second driving shaft (3) is connected to a cylinder barrel of a hydrostatic piston machine (4) in a torsionally rigid manner. The displacement volume of the hydrostatic piston machine (4) can be shifted by means of a shifting means (5), and the first driving shaft (2) can be mechanically coupled to the second driving shaft (3) through a clutch (6). The shifting means (5) and the clutch (6) can be actuated hydraulically and, for the purpose of actuation, are connected to a common control-pressure connection (11) or a common working-line connection (134).

20 Claims, 5 Drawing Sheets

DRIVE SYSTEM HAVING A COMMON CONTROL-PRESSURE CONNECTION

The invention relates to a drive system, particularly for commercial vehicles.

An additional braking device, which acts on the drive train, is frequently used in vehicles to assist the service brake. Known from WO 03/046380 A1 is the practice of routing a shaft of the drive train through a hollow shaft. The shaft of the drive train can be connected to the hollow shaft in a non-positive manner by a clutch. The hollow shaft itself is connected to a cylinder barrel of an axial piston machine. The displacement volume of the axial piston machine can be set.

In order to brake the vehicle through the axial piston machine, the drive shaft of the drive train is mechanically coupled to the hollow shaft by means of the clutch. The axial piston machine is thus driven via the hollow shaft, and the axial piston machine, as a pump, delivers a pressure medium into a hydraulic accumulator. The energy thus stored in the hydraulic accumulator can be used, in the reverse situation, i.e. accelerated travel, to transfer an additional driving torque to the drive train via the axial piston machine. In this state, the hollow shaft is likewise connected to the shaft of the drive train, and the axial piston machine is shifted to a corresponding swivel angle.

An electromagnetic control, which acts on a bearing, is provided to actuate the clutch. This bearing converts a rotary motion of a bearing ring into a stroke motion. This stroke motion acts on a clutch piston, which thereby applies a force to a package of clutch discs and thus connects the two shafts to each other in a non-positive manner.

The described actuation has the disadvantage that the use of an electromagnet to engage the clutch requires an electromagnet which is powerful enough to exert a large axial force, necessary because of the high effective torques, on the clutch discs. Such electromagnets are heavy, and moreover require a substantial structural space. Furthermore, both the axial piston machine, for shifting of the swashplate, and the clutch require a separate power supply.

A further disadvantage is that additional control cannot be provided in emergency situations, thus, for example, in the case of the failure of the actuating magnet.

The invention is based on the object of creating a drive system having a hydrostatic piston machine for storing and subsequently utilizing braking energy, in which a clutch and a shifting means of the piston machine can be actuated hydraulically and a common hydraulic connection is used.

The object is achieved by the drive system, according to the invention, having the features of claim 1.

In the case of the drive system according to the invention, a first driving shaft can be connected to a second driving shaft through a clutch. A hydrostatic piston machine is connected to the second driving shaft in a torsionally rigid manner. Upon actuation of the clutch, the hydrostatic piston machine is mechanically coupled to the first driving shaft. The displacement volume of the piston machine can be set. Both the shifting of the displacement volume of the hydrostatic piston machine and the actuation of the clutch are effected hydraulically. The pressure required for actuation of the clutch and for the shifting means is supplied to the clutch and the shifting means via a common control-pressure connection. It is thus possible to dispense with an additional element that generates the axial force to the clutch and that has to be supplied with a large amount of electric power independently of the shifting means.

The sub-claims relate to advantageous developments of the drive system according to the invention.

In particular, it is advantageous, for the purpose of applying a hydraulic force to a clutch piston surface, to provide an internal connection between the control-pressure connection and the clutch. Such an internal connection, which runs in the wall of the housing of the hydrostatic piston machine, does not require any additional pressure-proof lines to be laid on the outside of the housing. Not only does this improve the compactness of the piston machine as a whole, but it also prevents possible damage to the pressure-carrying lines.

Furthermore, the actuation of the clutch is preferably effected via a clutch valve. By means of this clutch valve, the hydraulic pressure supplied via the control-pressure connection is forwarded to the clutch piston surface. The use of such a clutch valve enables high pressures to be switched and, consequently, large forces to be applied for the purpose of actuating the clutch, whilst only a small structural volume is required for the valve, owing to the low volumetric flows required.

According to a further preferred embodiment, a pneumatic-hydraulic converter is additionally provided. The pneumatic-hydraulic converter enables a pneumatic pressure source to be used for the indirect generation of a hydraulic pressure which acts on the clutch piston surface. It is thereby possible, even in the case of starting for the first time, when no hydraulic pressure has yet built up, to actuate the clutch in order to engage the pump for the first time, and actuation of the clutch is still possible even in the event of a drop in the pressure at the control-pressure connection.

In order that the shifting of the hydrostatic piston machine can also be assured at the same time in such emergency situations, the output of the pneumatic-hydraulic converter can also be connected to the control-pressure connection. The hydraulic pressure generated through the pneumatic-hydraulic converter is then equally available at the control-pressure connection of both the clutch actuation and the shifting means of the hydrostatic piston machine.

A preferred exemplary embodiment of the drive system according to the invention is represented in the drawing, and is explained more fully in the following description.

Figure 1:
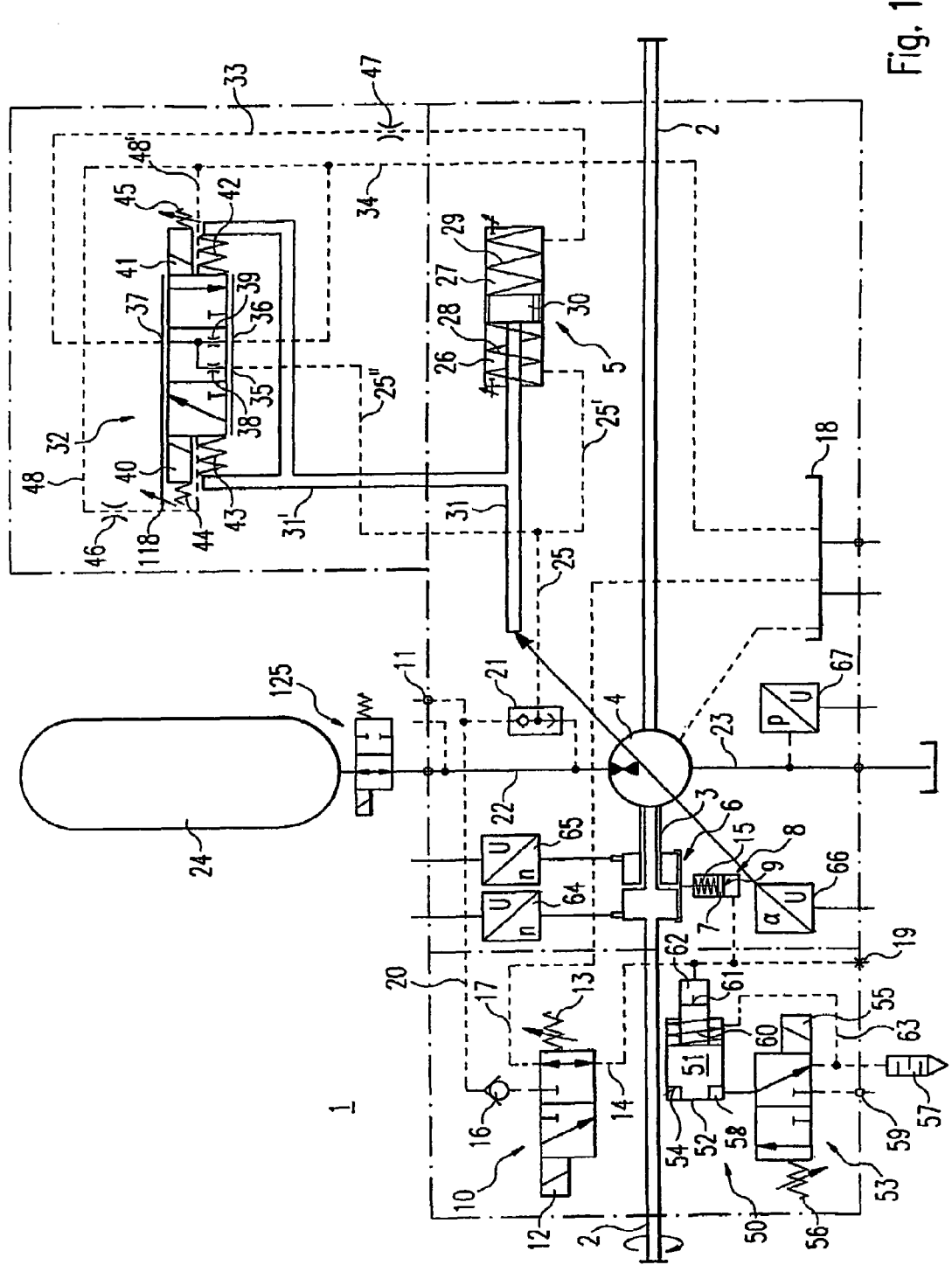
FIG. 1 shows a hydraulic circuit diagram of a first exemplary embodiment of the drive system according to the invention.

FIG. 1 shows a drive system 1 according to the invention. The drive system 1 according the invention may be, in particular, a portion of a drive train of a commercial vehicle. The drive system 1 comprises a first driving shaft 2 and a second driving shaft 3. The first driving shaft 2 is connected, for example, both to an output shaft of a manual transmission and to an axle final drive.

The second driving shaft 3 is realized as a hollow shaft, and runs freely on the first driving shaft 2. The second driving shaft 3 is firmly connected to a cylinder barrel of a hydrostatic piston machine 4. The hydrostatic piston machine 4 can be operated both as a pump and as a motor, and its displacement volume can be set. The term displacement volume is also to be understood to include the motor displacement volume when the hydrostatic piston machine 4 is operated as a motor. To simplify the description, only the term displacement volume is used in the following. For the purpose of shifting the hydrostatic piston machine 4, a shifting means 5 is provided which acts on a swashplate of the hydrostatic piston machine 4, which swashplate can be swiveled in both directions out of its neutral position.

In order that a torque can be transferred between the first driving shaft 2, which is connected to the drive train of the vehicle, and the hydrostatic piston machine 4, the first driving shaft 2 and the second driving shaft 3 can be mechanically coupled via a clutch 6. The clutch 6 is actuated by means of a clutch piston 7, to which hydraulic pressure can be applied and which is disposed in a clutch cylinder 8. For the purpose of applying the hydraulic pressure, a clutch piston surface 9 is realized on the clutch piston 7, said clutch piston surface 9, together with the clutch cylinder 8, realizing a pressure chamber.

To actuate the clutch 6, the clutch piston surface 9 is either subjected to or relieved of a hydraulic force. A clutch valve 10 is provided for this purpose. A pressure medium is supplied to the intake side of the clutch valve 10 via a control-pressure connection 11. Upon actuation of an electromagnet 12, which brings the clutch valve 10 into its working position against the force of an adjusting spring 13, the control-pressure connection 11 is connected to an actuating channel 14. The pressure present at the control-pressure connection 11 is thus supplied, via the clutch valve 10 and the actuating channel 14, to the pressure chamber of the clutch cylinder 8, where it acts upon the clutch piston surface 9.

A clutch spring 15, by which the clutch piston 7 is held in its home position as pressure vanishes, acts on the clutch piston 7 against the force acting in the pressure chamber. If, following actuation of the electromagnet 12, the pressure of the control-pressure connection 11 is then applied to the clutch piston surface 9, the clutch piston 7 is displaced against the force of the clutch spring 15, and the clutch 6 is thereby actuated. In the case of the exemplary embodiment represented, the actuation of the clutch 6 causes the first driving shaft 2 to be connected to the second driving shaft 3 in a non-positive manner. According to this preferred embodiment, the first driving shaft 2 is mechanically separated from the second driving shaft 3 by the clutch spring 15 when the clutch 6 is in the home position.

The hydraulic pressure is supplied from the control-pressure connection 11 to the clutch valve 10 via a non-return valve 16 opening towards the clutch valve 10. In an emergency operation, which is to be explained more fully in the following, an unwanted reduction in pressure is prevented by the non-return valve 16.

If, following an actuation, the mechanical coupling of the first driving shaft 2 to the second driving shaft 3 is to be released again, the electromagnet 12 is no longer supplied with electric power. The electromagnet 12 thus no longer exerts a force against the adjusting spring 13, and the clutch valve 10 returns to its initial position. In the initial position, in which the clutch valve 10 is held by the adjusting spring 13, the clutch valve 10 connects the actuating channel 14 to a relief channel 17, which opens into a tank volume 18. The pressure chamber in the clutch cylinder 8 is thus connected to the tank volume 18 via the actuating channel 14, the clutch valve 10 and the relief channel 17. The clutch spring 15 can thus displace the clutch piston 7 towards its home position and force the pressure medium present in the pressure chamber into the tank volume 18.

The actuating channel 14 has a venting connection 19. The venting connection 19 provides for venting of the hydraulic channels and volumes of the clutch actuation, so that air locks are prevented and high operational reliability is achieved.

The control-pressure connection 11, which is connected to the non-return valve 16 via a supply-line channel 20, is connected to a first intake of a shuttle valve 21. A second intake of the shuttle valve 21 is connected to a first working line 22. This first working line 22 connects the hydrostatic piston machine 4 to a hydraulic accumulator element 24, into which the hydrostatic piston machine 4 delivers a pressure medium, drawn in via the second working line 23, when it is operated as a pump for braking a vehicle. To enable the hydrostatic piston machine 4 to be operated as a pump, the clutch 6 must be actuated and, in addition, the hydrostatic piston machine 4 must be shifted to a corresponding swivel angle, out of its neutral position, by the shifting means 5.

The hydrostatic piston machine 4 is shifted by a shifting means 5, which regulates the displacement volume of the hydrostatic piston machine 4 in dependence on an actuating pressure regulated by a regulating valve 32. Pressure medium is supplied to the shifting means 5 via a supply channel 25, which is connected to the outlet of the shuttle valve 21. The pressure medium is supplied either by the control-pressure connection 11, or from the accumulator element 24 if the pressure in the accumulator element 24 exceeds the control pressure.

The supply channel 25 branches into a first supply branch 25' and a second supply branch 25". The first supply branch 25' opens out into a first actuating-pressure chamber 26 of the shifting means 5. The first actuating-pressure chamber 26 and the second actuating-pressure chamber 27 are realized in the shifting means 5 on either side of an actuating piston 30, which is held in its home position by a first return spring 28 and a second return spring 29. When the actuating piston 30 is in the home position represented, the hydrostatic piston machine 4, which can be set, via a linkage 31, in respect of its displacement volume in dependence on the position of the actuating piston 30, is likewise in its neutral position. In the neutral position, the hydrostatic piston machine 4 is set to a smaller displacement volume. The hydrostatic piston machine can be shifted out of the neutral position, to both sides. In the neutral position, the pump delivers just so much oil to cover its own actuating oil requirement and to permit the assumption of a clutch function.

The set displacement volume is fed back to the regulating valve 32 via a further linkage 31', which is connected to the linkage 31. When the regulating valve 32 is in the central position represented, the second actuating-pressure chamber 27 is connected in a throttled manner to the second supply branch 25" and to a tank channel 34 via an actuating-pressure channel 33. As a result, the pressure required for force equilibrium ensues in the second actuating-pressure chamber 27.

For the purpose of equalizing the different effective piston surfaces of the actuating piston 30 in the first actuating-pressure chamber 26 and in the second actuating-pressure chamber 27, an intake throttle 38 and an outlet throttle 39 respectively, which can be constituted by the respective control edge with negative overlap, are provided in the regulating valve 32, in its central position, both at an intake connection 35, which is connected to the second supply branch 25", and at the tank outlet 36, which is connected to the tank channel 34.

In order, for example, to generate a braking torque when the clutch 6 is actuated, the hydrostatic piston machine 4 is operated as a pump. For this, the hydrostatic piston machine 4 must be pivoted out of its neutral position. For the purpose of swiveling the hydrostatic piston machine 4 there is provided, for example, a first actuating magnet 40, which shifts the regulating valve 32 out of its central position towards a first end position. In the opposite direction, a force can be applied to the regulating valve 32 by a second actuating magnet 41.

As long as there is no control signal present at the first actuating magnet 40 and the second actuating magnet 41, the position of the regulating valve 32 is determined by a first feedback spring and a second feedback spring 43. The thrust bearing for the first feedback spring 42 and the second feedback spring 43 is respectively realized on the further linkage 31'. The preferably identical feedback springs 42 and 43 then centre the regulating valve 32 in its central position when the actuating piston 30 is in its home position.

If a control signal is then present at the first actuating magnet 40, for the purpose of pivoting the swashplate of the hydrostatic piston machine 4, the regulating valve 32 is shifted towards its first end position, against the force of the first feedback spring 42. As a result, the intake connection 35 is connected to the actuating-pressure connection 37 in an increasingly unthrottled manner, and oil therefore flows into the second actuating-pressure chamber 27. The actuating piston 30 is thus displaced to the left in FIG. 1, and the hydrostatic piston machine 4 is shifted, starting from its neutral position, towards a greater displacement volume.

Simultaneously with this shift, a force, increasing in magnitude owing to the displacement of the further linkage 31', is generated by the first feedback spring 42, against the force of the first actuating magnet 40, until an equilibrium of forces ensues at the regulating valve 32 and there is no further swiveling of the hydrostatic piston machine 4. The hydrostatic piston machine 4 is thus set, in dependence on the magnitude of the control signal supplied to the first actuating magnet 40, to a certain displacement volume, which results in a corresponding braking effect, in that the hydrostatic piston machine 4 delivers against the pressure already present in the accumulator element 24.

The actuation of the hydrostatic piston machine 4 via the first driving shaft 2 and the second driving shaft 3, which is connected to said first driving shaft by means of the clutch 6, causes the hydrostatic piston machine 4 to draw in pressure medium out of the second working line 23, and to deliver it, via the first working line 22, into the accumulator element 24. The accumulator element 24 is, for example, a hydraulic diaphragm accumulator or a piston accumulator with gas-cylinder counter-pressure, which permits the accumulation of substantial hydraulic energy.

At the end of the braking operation, the control signal for the first actuating magnet 40 is withdrawn and, owing to the force of the first feedback spring 42, the actuating-pressure regulating valve 32 moves back towards its second end position. The second actuating-pressure chamber 27 is thereby connected, in an increasingly unthrottled manner, to the tank volume 18, with the result that the pressure in the first actuating-pressure chamber 26 moves the oil of the second actuating-pressure chamber 27, via the regulating valve 32, into the tank channel 34. The pressure medium flowing out of the second actuating-pressure chamber 27 for the purpose of volume equalization is thereby relieved into the tank volume 18 via the actuating-pressure channel 33, the actuating-pressure regulating valve 32 and the tank channel 34.

Damping and hydraulic equalization of the movement of the regulating valve 32 is effected by a controlled leakage towards the first actuating magnet 40 and towards the second actuating magnet 41, the leakage being discharged via a respective leakage channel, 48 and 48' respectively. The leakage channels 48 and 48' respectively open out into the tank channel 34. In this case, a throttle point 46 is provided in the leakage channel 48 for the purpose of setting a damping that is dependent on the direction of movement. A further throttle point 47 is also provided in the actuating-pressure channel 33 for the purpose of setting the actuating speeds.

Following a braking operation, in which the hydrostatic piston machine 4 operates as a pump, the accumulator element 24 stores hydraulic energy which can be used by the operation of the hydrostatic piston machine 4 as a motor, in a subsequent acceleration. Since the pressure medium now flows out of the accumulator element 24 to the hydrostatic piston machine 4 via the working line 22, the hydrostatic piston machine 4 must be swiveled in the opposite direction, in order to maintain the direction of rotation.

In order to prevent an unwanted loss of pressure from the accumulator element 24, an accumulator charging valve 125, which can be actuated by an electromagnet against a spring, is provided in the connection of the accumulator element 24. In the two operating positions, a connection between the accumulator element 24 and the first working line 22 is either made or broken. The inhibiting position, which corresponds to the home position, is operated when the piston machine 4 is disengaged.

For the purpose of pivoting the piston machine 4 in the opposite direction, a control signal is supplied to the second actuating magnet 41, as a result of which the regulating valve 32 is shifted in towards its second end position. An actuating-pressure connection 37, which is connected to the actuating-pressure channel 33, is thereby connected to the tank outlet 36 in an increasingly unthrottled manner, as a result of which the increasingly unthrottled connection relieves the second actuating-pressure chamber 27 towards the tank volume 18. Owing to the force difference that is produced, the actuating piston 30 moves to the right in FIG. 1 and, via the linkage 31, causes the hydrostatic piston machine 4 to be pivoted out of the neutral position, in the direction opposite to the direction previously described in the case of the braking operation. A further equalization of forces then ensues between the force of the second actuating magnet 41 and the opposing force of the second feedback spring 43.

Upon the displacement of the regulating valve 32 by the first actuating magnet 40 and the second actuating magnet 41, there is respectively added to the force of the actuating magnets 40 and 41 the force of the feedback springs 43 and 42 respectively, which respectively act in the same direction, and the force of a first spring 44 and of a second spring 45 respectively. The second spring 45 is realized such that it can be set against the first spring 44, and permits equalization of, for example, tolerances of the actuating magnets 40 and 41.

The regulating valve 32 has an adjustable control bushing 118. The adjustable control bushing 118 of the regulating valve 32 permits equalization for the purpose of setting the neutral position of the shifting operation.

Upon a reversal of the direction of travel, and the associated change in the direction of rotation of the first driving shaft 2 and the second driving shaft 3, the control of the first actuating magnet 40 and of the second actuating magnet 41 also changes accordingly.

For the purpose of actuating the shifting operation, other valves are also provided, in particular proportional regulating valves having electrical feedback, or regulating valves having 4-edge control in combination with an equal-action piston. Feedback is also effected via springs, as described for the exemplary embodiment represented.

In the case of the represented preferred exemplary embodiment of FIG. 1, provision is made for an emergency actuation, in the event that the actuation of the clutch 6 cannot be effected via the clutch valve 10 in the manner described above. In this case, the hydraulic pressure necessary for actuation of the clutch 6 is generated indirectly, through a pneumatic-hydraulic converter 50. For the purpose of generating the hydraulic pressure, a converter piston 51 is disposed in a converter cylinder 52. A pneumatic valve 53 enables a pneumatic pressure to be applied to a converter piston surface 54 realized on the converter piston 51.

In normal operation, a force, which holds the valve 53 in its initial position against the force of a settable compression spring 56, is applied to the valve 53 through an electromagnet 55. In this initial position, only the atmospheric pressure acts on the converter piston surface 54, since a pressure chamber 58, in which the converter piston surface 54 is disposed, is discharged into the environment via a silencer 57, through the valve 53.

If, by contrast, the electromagnet 55 is not supplied with electric power, the settable compression spring 56 brings the valve 53 into its working position. When the valve 53 is in the working position, a pneumatic pressure source is connected to the pressure chamber 58 via a pneumatic pressure connection 59. The converter piston 51 is displaced to the right in FIG. 1, against the force of a converter-piston return spring 60, by the pneumatic pressure now acting on the converter piston surface 54, provided that the opposing hydraulic force and the force of the converter-piston return spring 60 is overcome by the pneumatic force. Realized on the converter piston 51 is a pressure-generating surface 61 which, in a hydraulic volume 62, thereby exerts a pressure on the pressure medium present in the hydraulic volume 62. The hydraulic volume 62 is connected to the actuating channel 14. The hydraulic volume 62 is filled by the inflowing of the pressure medium upon actuation of the clutch 6, said inflowing being assisted by the converter-piston return spring 60.

For this, the actuation of the clutch valve 10 and of the valve 53 is synchronized, so that pressure medium can be fed via the relief channel 17 to fill the hydraulic volume 62. To build up pressure, by contrast, the clutch valve 10 is brought into its second end position, in which a drop in pressure is prevented by the non-return valve 16.

The pneumatic pressure acting, at the converter piston 51, on its converter piston surface 54 causes a pressure to be generated at the pressure-generating surface 61 in the hydraulic volume 62. This pressure acts on the clutch piston surface 9, to actuate the clutch 6, and thereby causes the first driving shaft 2 to be coupled to the second driving shaft 3, even without the presence of a control pressure at the control-pressure connection 11.

In this case, the electromagnet 12 of the clutch valve 10 is also supplied with electric power for the purpose of actuating the clutch 6 in emergency operation, so that the non-return valve 16 prevents the pressure generated by the pneumatic-hydraulic converter 50 from being reduced. In order, furthermore, to provide for a maximally efficient utilization of the pressure present at the pneumatic pressure connection 59, the volume realized on the back side of the converter piston 51 as a spring chamber for the converter-piston return spring 60 is likewise connected to the silencer 57, via a pressure equalization line 63, with the result that no compression work need be performed.

In the case of the represented preferred embodiment, the represented valves are in each case controlled by means of electromagnets. The invention, however, is not limited thereto. The control may also be respectively realized through, for example, the application of a hydraulic force to appropriately realized surfaces of the valves.

Figure 3:
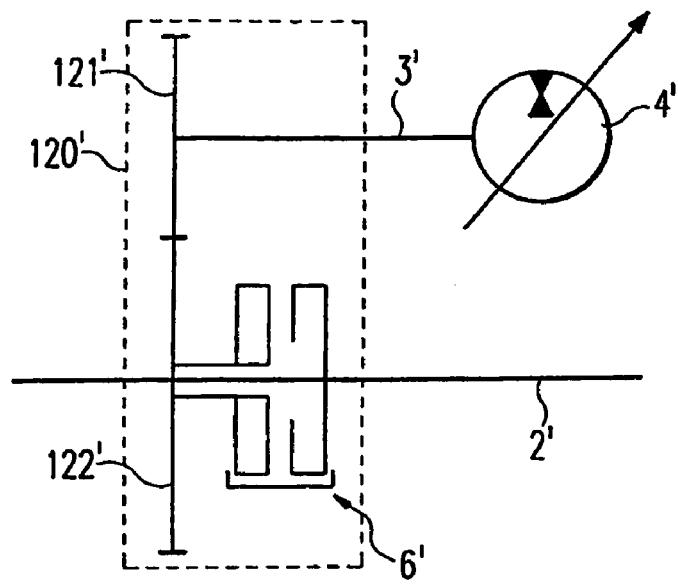
FIG. 3 shows a detail of the hydraulic circuit diagram having a first alternative arrangement of the clutch.
Figure 4:
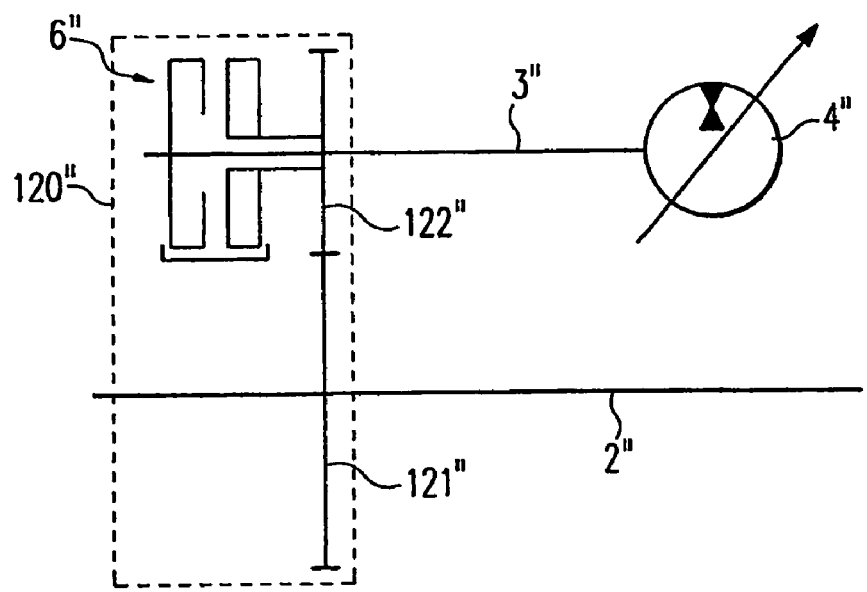
FIG. 4 shows a detail of the hydraulic circuit diagram having a second alternative arrangement of the clutch.

Instead of the first driving shaft 2 being disposed in the second driving shaft 3, realized as a hollow shaft, as represented in FIG. 1 as a preferred and particularly space-saving exemplary embodiment, the first driving shaft and the second driving shaft may also be so disposed that they are offset relative to one another. Such an arrangement is represented in FIGS. 3 and 4. In FIG. 3, the components already explained in connection with the exemplary embodiment of FIG. 1 have been given references with a single stroke, while in the further exemplary embodiment of FIG. 4 they are denoted by corresponding references with a double stroke.

In the exemplary embodiment represented in FIG. 3, the hydrostatic piston machine 4' is connected to the second driving shaft 3'. At the end of the second driving shaft 3', there is connected to same a fixed gear 121' which constitutes a first gear of a transmission stage. The transmission stage is disposed in a transmission housing 120' and is completed by an idler gear 122'. The idler gear 122' is in permanent engagement with the fixed gear 121', and can be mechanically coupled to the first driving shaft 2' via the clutch 6'.

The clutch 6' corresponds in its structure to the clutch known from FIG. 1, i.e. it is hydraulically actuated. For this, the supply-line channel 20 from FIG. 1 is extended as far as the transmission housing 120', so that the clutch 6', as in the case of the exemplary embodiment known from FIG. 1, is likewise supplied with pressure medium via a control-pressure connection 11.

A further exemplary embodiment is represented in FIG. 4. In this case, in contrast to the preceding exemplary embodiment of FIG. 3, the idler gear 122" is disposed on the second driving shaft 3". The idler gear 122" is again permanently connected to the fixed gear 121". The fixed gear 121" is firmly connected to the first driving shaft 2". The non-positive connection between the idler gear 122" and the second driving shaft 3" is again produced through a clutch 6" disposed in the transmission housing 120". For this, the supply-line channel 20 is again connected to the clutch 6" via, for example, an additional line. In the transmission housing 120", a corresponding portion of the supply-line channel 20 can then be realized as a further supply-line channel portion.

For the purpose of controlling the drive system 1 according to the invention, the rotational speed of the first driving shaft 2 is ascertained by a first rotational-speed sensor 64, and the rotational speed of the second driving shaft 3 is ascertained by a second rotational-speed sensor 65. To enable a control signal rated in dependence on the required braking or acceleration power to be supplied to the first actuating magnet 40 and to the second actuating magnet 41, the respectively set swivel angle of the hydrostatic piston machine 4 is additionally ascertained by means of an angle sensor 66, and transmitted, together with the rotational-speed signals and the pressure in the second working line 23, measured by a pressure sensor 67, to a controller (not shown). On the basis of the measured values, which are forwarded as electrical signals, this controller determines the signal quantities required for a predetermined deceleration or acceleration. In this case, the angle sensor 66 is also used for feedback of an electronic control circuit.

Figure 2:
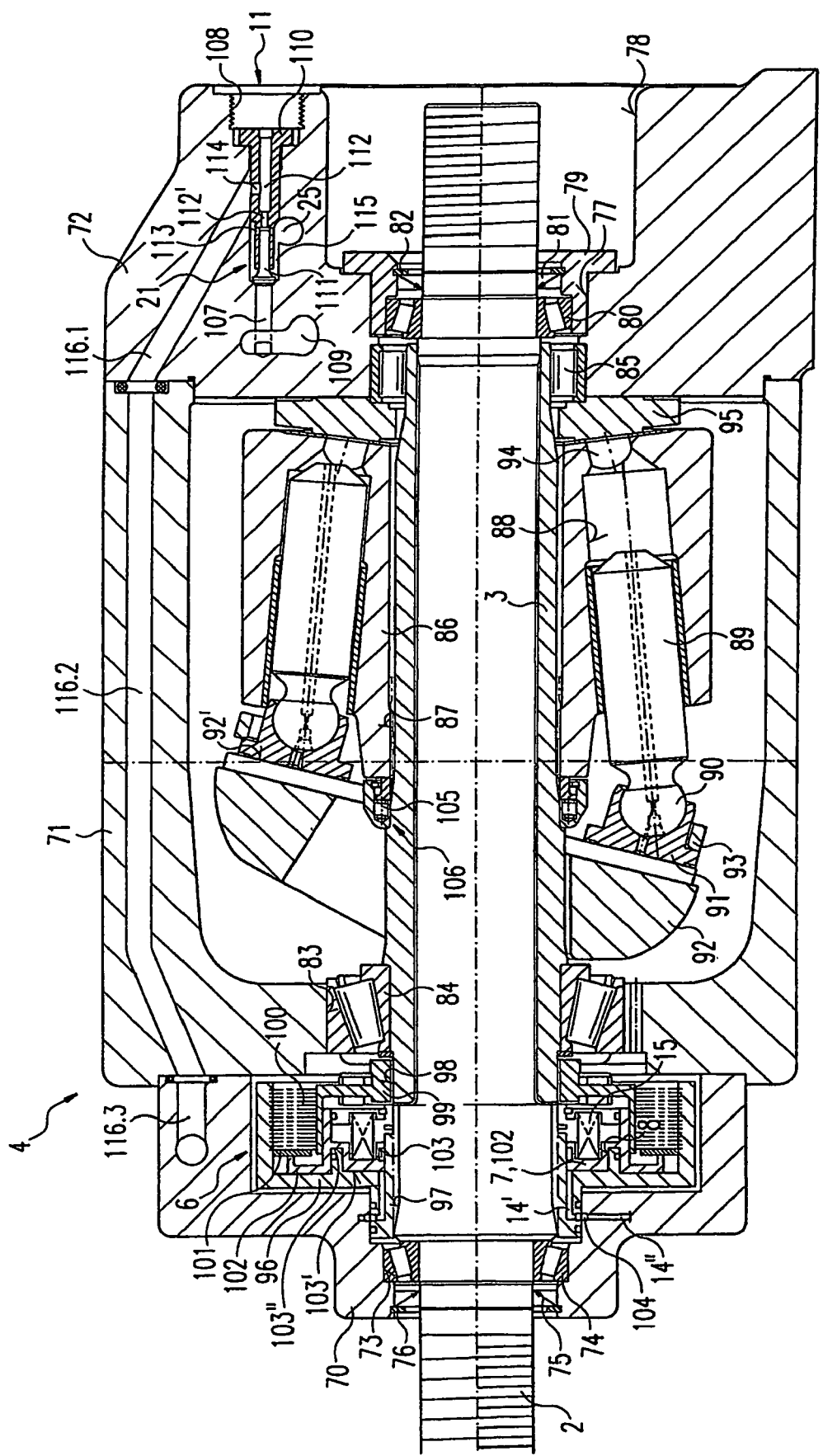
FIG. 2 shows a simplified representation of a hydrostatic piston machine of the first exemplary embodiment of the drive system according to the invention.

FIG. 2 shows a section through a hydrostatic piston machine 4 of a drive system 1 according to the invention. The hydrostatic piston machine 4 has a three-part housing, in which a housing cover 70 closes a housing body 71, the clutch 6 being disposed in the housing cover 70. On the opposite side of the housing body 71 the housing is completed by a connecting plate 72.

The first driving shaft 2 extends through the entirety of the housing of the hydrostatic piston machine 4. For this, the housing cover 70 has a through aperture 73. The through aperture 73 is realized as a multi-stage aperture, and widens towards the housing body 71 in such a way that the clutch 6 can be disposed in the widening through aperture 73. A first tapered roller bearing 74 is disposed in the through aperture 73 for the purpose of supporting the first driving shaft 2. The inner bearing ring of the first tapered roller bearing 74 is supported, in the axial direction, on a shoulder of the first driving shaft 2, whilst the outer bearing ring of the first tapered roller bearing 74 is inserted into the through aperture 73 from the side of the housing cover 70 that faces the housing body 71, and is supported there on a corresponding shoulder. Towards the exterior of the housing, adjacent to the first tapered roller bearing 74 there is a first sealing element 75, which is fixed in the through aperture 73 by means of a first locking ring 76.

At the opposite end of the hydrostatic piston machine 4, a further through aperture 77, which opens out into a recess 78 made into the connecting plate 72 from the outside, is realized in the connecting plate 72. For the purpose of supporting the driving shaft 2 and fixing it in position, there is inserted into this further through aperture 77 a retaining ring 79, which receives an outer bearing ring of a second tapered roller bearing 80. The inner bearing ring of the second tapered roller bearing 80 is again supported on a shoulder of the first driving shaft 2. The two tapered roller bearings 74 and 80, disposed in an O arrangement, thus fix the first driving shaft 2 in position in both the radial and the axial direction. Towards the exterior of the housing of the hydrostatic piston machine 4, adjacent to the second tapered roller bearing 80 there is a second sealing element 81, which is fixed in position by a second locking ring 82.

On its side which is oriented towards the housing cover 70, the housing body 71 has an aperture 83 in which is disposed the outer bearing ring of a third tapered roller bearing 84. The inner bearing ring of the third tapered roller bearing 84 is pressed onto the second driving shaft 3. At the opposite end of the second driving shaft 3, which is realized as a hollow shaft, there is a cylindrical roller bearing 85, which likewise is inserted into the further through aperture 77 of the control block 72. The first driving shaft 2 and the second driving shaft 3 are thus supported on bearings independently of one another, with the result that the two driving shafts 2 and 3 can rotate independently of one another. In particular, the hollow shaft, i.e. the second driving shaft 3, can thus have a vanishing rotational speed, whilst the first driving shaft 2 rotates according to the travel speed of the vehicle. In normal driving operation, drag losses by the hydrostatic piston machine 4 are thereby prevented.

A cylinder barrel 86 is permanently connected to the second driving shaft 3 in a torsionally rigid manner, for which purpose a toothing that corresponds with a toothing 87 of the second driving shaft 3 is inserted into a central recess of the cylinder barrel 86. Through this toothing 87, the cylinder barrel 86 is disposed on the second driving shaft 3 so as to be displaceable in the axial direction and, at the same time, torques can be transferred between the cylinder barrel 86 and the second driving shaft 3. In the cylinder barrel 86, a plurality of cylinder bores 88 are uniformly distributed over the circumference of the cylinder barrel 86. A respective piston 89 is disposed, so as to be longitudinally displaceable, in the cylinder bores 88.

For the purpose of generating a stroke motion of the pistons 89, a ball head 90 is respectively realized on the pistons 89, at the end projecting out of the cylinder barrel 86, each ball head 90 being connected to a slipper 91. The slipper 91 is supported on a slide surface 92' of a swashplate 92 such that, upon an inclination of the swashplate 92 relative to the axis of rotation of the cylinder barrel 86, the pistons 89 in the cylinder bores 88 execute a stroke motion. In order to prevent the slippers 91 from being raised from the slide surface 92' of the swashplate 92 during an induction stroke in pump operation, a retracting plate 93 is provided, which is supported on a spherical counter-bearing 106.

The spherical counter-bearing 106 also comprises compression springs 105 which are supported, via an intermediate piece, on the cylinder barrel 86. The spherical counter-bearing 106 thus causes a force to be applied axially, in opposite directions, to the cylinder barrel 86 and the second driving shaft 3. The side of the cylinder barrel 86 facing away from the swashplate 92 is likewise slightly spherical in form. Cylinder apertures 94, through which the pressure medium enters and emerges from the cylinder bores 88, open out into this spherical surface.

In a manner which is not represented, in the case of operation of the hydrostatic piston machine 4 as a pump the pressure medium is delivered through the cylinder apertures 94, via a control kidney (not shown) of a control plate 95 and, further, via the connecting plate 72, to one of the working lines connected thereto. Owing to the spherical design of the bearing surface between the cylinder barrel 86 and the control plate 95, the cylinder barrel 6 is centred on the control plate 95. In addition, because of the compression spring 105 sealing of the cylinder barrel 86 on the control plate 95 is achieved, thereby reducing leakage losses.

As already explained with reference to the hydraulic circuit diagram of FIG. 1, a clutch 6 is provided to mechanically couple the first driving shaft 2 to the second driving shaft 3. The clutch 6 comprises a clutch basket 96, which is connected in a torsionally rigid manner to the first driving shaft 2, via a first slaving toothing 97. Accordingly, the second driving shaft 3 is provided with a second slaving toothing 98, to which a clutch hub 99 is connected in a torsionally rigid manner. The clutch hub 99 in this case is somewhat pot-shaped, and projects into the likewise approximately pot-shaped clutch basket 96. For this purpose, the clutch basket 96 is disposed inversely relative to the clutch hub 99, in such a way that the clutch basket 96 and the clutch hub 99 overlap for a portion in the axial direction.

The outer diameter of the clutch hub 99 is smaller than the inner diameter of the clutch basket 96, such that an annular clearance is produced between the clutch basket 96 and the clutch hub 99. Disposed in this clearance are a number of clutch discs 100 which, respectively, are alternately connected to the clutch basket 96 and to the clutch hub 99 in a torsionally rigid manner. As long as the clutch discs 100 are not pressed in the axial direction, no frictional force is generated between them and they are able to rotate counter to one another, with the result that no torque is transferred between the clutch basket 96 and the clutch hub 99. The clutch basket 96 is of such design that it simultaneously constitutes the clutch cylinder denoted by the reference 8 in FIG. 1.

In order to change from this disengaged state to an engaged state, a pressure plate 101 applies a force to the clutch discs 100 in the axial direction. This axial force presses the clutch discs 100 on to one another, with the result that, because of the friction acting between the clutch discs 100, a torque is transferred from the first driving shaft 2, via the clutch basket 96 and the portion of the clutch discs 100 in engagement therewith, to the portion of the clutch discs 100 in engagement with the clutch hub 99.

For the purpose of generating the axial force onto the pressure plate 101, a clutch piston 102 is provided, which can be subjected to a hydraulic pressure on a clutch piston surface, consisting of the clutch piston partial surfaces 103, 103' and 103", and which corresponds to the clutch piston 7 of FIG. 1. For the purpose of realizing the clutch piston surface denoted by the reference 9 in FIG. 1, shoulders, as clutch piston partial surfaces 103, 103' and 103", are realized on the clutch piston 102. Furthermore, a plurality of actuating channel portions 14' which, at least partially, open out at one end into a cavity realized between the clutch piston partial surface 103 and the clutch basket 96, run in the clutch basket 96. At their other end, the actuating channel portions 14' of the clutch basket 96 open out into a perimeter groove 104 in such a way that they are permanently connected to a further actuating channel portion 14" disposed in the housing cover 70. The actuating channel portions 14' and the actuating channel portion 14" together constitute the actuating channel 14 of FIG. 1.

The perimeter groove 104, with adjacent seals, constitutes a rotating union for the actuating channel 14' to 14".

For the purpose of realizing the control-pressure connection 11, a two-stage recess 107 is made in the connecting plate 72. The two-stage recess 107 widens towards the exterior of the connecting plate 72, a screw thread 118, for the connection of a control-pressure line (not shown), being provided in the outer, widened region. In the exemplary embodiment represented, the two-stage recess 107 is realized as a blind hole in the connecting plate 72, the bore opening out into a channel 109 which is connected to the first working line 22, which is not visible in FIG. 2.

A shuttle valve insert 110 is inserted into the two-stage recess 107. The shuttle valve insert 110 is likewise of a multistage design. Disposed in an axially displaceable manner in a sleeve-type end of the shuttle valve insert 110 is a lifter 111, at the ends of which a respective sealing surface is realized. The lifter 111 either sits in a sealing manner on the stage of the two-stage recess 107 that is oriented towards the channel 109 or, alternatively, it closes the axial aperture 112'. Radial apertures 113, which are disposed in the sleeve-type portion of the shuttle valve insert 110, connect the open axial aperture 112' to the annular space 115 and the supply channel 25. When the lifter 111 bears in a sealing manner on the stage of the two-stage recess 107, the connection between the annular space 115 and the channel 109 is broken, whilst the pressure medium, supplied from the control-pressure connection 11 via a central bore 112 and the thereto adjoining axial aperture 112' of the shuttle valve insert 110, is able to flow into the annular space 115 and consequently into the supply channel 25.

If, on the other hand, the lifter 111 is at its opposite stop, it closes the axial aperture 112' and the channel 109 is connected to the supply channel 25 via the annular space 115.

The shuttle valve insert 110 additionally has a portion whose outer diameter corresponds with the diameter of the middle portion of the two-stage recess 107. In this region, there also opens into the two-stage recess 107 a first supply-line channel portion 116.1, which leads therefrom, through the connecting plate 72, to a contact surface of the connecting plate 72 with the housing body 71. Realized in the housing body 71, for the purpose of continuing the channel, is a second supply-line channel portion 116.2, via which the pressure medium is routed from the control-pressure connection 11 into the housing cover 70, in which a third supply-line channel portion 116.3 is realized. The first, second and third supply-line channel portions 116.1, 116.2 and 116.3 thus constitute the supply-line channel 20 shown in FIG. 1, and route the pressure medium supplied via the control-pressure connection 11 to the clutch valve 10, which is preferably disposed in the housing cover 70 and is not visible in the portion represented in FIG. 2. A further radial aperture 114 is provided in the shuttle valve insert 110 to connect the control-pressure connection 11 to the first supply-line channel portion 116.1.

At the points at which the first supply-line channel portion 116.1 connects to the second supply-line channel portion 116.2, and the second supply-line channel portion 116.2 connects to the third supply-line channel portion 116.3, there is respectively realized in the housing cover 70 and in the housing body 71 a shoulder into which, for example, an O-ring seal is inserted.

The drive system 1 according to the invention is not restricted to the exemplary embodiment represented. Instead of the represented shuttle valve 21, it is also possible to use, for example, a valve equipped with a ball as a closing element. The control of the valves, represented in the hydraulic circuit diagram of FIG. 1, by electromagnets likewise constitutes only a preferred embodiment.

The exemplary embodiment represented in FIG. 2 shows a particularly space-saving arrangement of the first driving shaft 2 in the second driving shaft 3, which is realized as a hollow shaft, both driving shafts extending through the hydrostatic piston machine 4. Equally, however, the first driving shaft, the second driving shaft and the hydrostatic piston machine may be disposed non-concentrically, or at least axially offset, relative to one another, as already explained with the example of a transmission stage between the first driving shaft and the second driving shaft in FIGS. 3 and 4.

Figure 5:
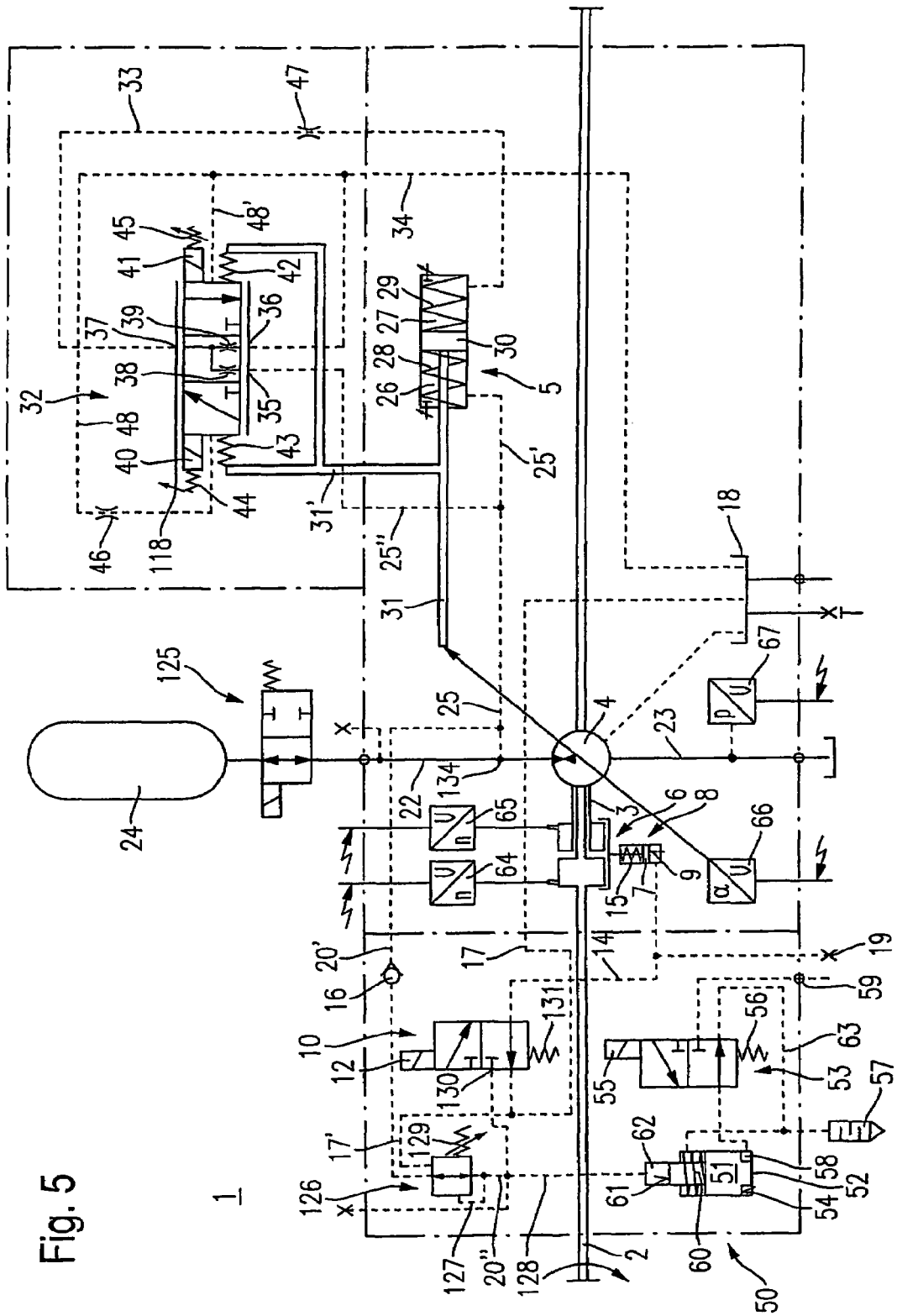
FIG. 5 shows a hydraulic circuit diagram of a second exemplary embodiment of the drive system according to the invention.

A second exemplary embodiment of the drive system according to the invention is represented in FIG. 5. Here, the pressure necessary for actuation of the clutch 6 is supplied to the clutch valve 10 via a supply-line channel 20', the supply-line channel 20' not admitting pressure via a control-pressure connection, but being supplied with pressure medium directly from the working line 22. For this purpose, the supply-line channel 20' is connected to the first working line 22 via the supply channel 25 and a working-line connection 134. Since the pressure in the supply-line channel 20' can no longer be predetermined in this manner independently of the delivery pressure of the hydrostatic piston machine 4, a pressure-reducing valve 126 is provided in the supply-line channel 20'.

If a pressure prevailing in a portion 20" of the supply-line channel 20' between the pressure-reducing valve 126 and the clutch valve 10, which pressure is fed back to the pressure-reducing valve 126 through a measuring line 127, exceeds a pressure value that can be set by means of a spring 129, the pressure-reducing valve 126 causes the portion 20" of the supply-line channel 20' to be connected to the relief channel 17 via a connecting portion 17'. Through the pressure-reducing valve 126, a pressure is thus set, in the portion 20" of the supply-line channel 20', at which reliable actuation of the clutch 6 is possible without loading the clutch actuation with excessively high pressures.

Since the clutch actuation is now effected by means of a pressure generated by the hydrostatic piston machine 4, the delivery volume of the hydrostatic piston machine 4 is not reset to zero. Rather, the piston machine 4 is set, in its neutral position, to a minimum swivel angle such that, upon the first driving shaft 2 being connected to the second driving shaft 3 through a pneumatic actuation of the clutch 6, a sufficient pressure is generated by the hydrostatic piston machine 4 to permit subsequent hydraulic actuation of the clutch 6 and thus achieve full non-positive connection. The forces achievable on the clutch 6 through purely hydraulic actuation substantially exceed those achievable with pneumatic actuation. Pneumatic-hydraulic actuation is therefore not adequate for operation of the hydrostatic piston machine 4 at high outputs.

If, for the purpose of pneumatic actuation, the pneumatic valve 53 is operated and a pressure is thus generated in the hydraulic volume 63, unlike the case of the first exemplary embodiment of FIG. 1 this pressure is supplied, via a pressure line 128, to the portion 20" of the supply-line channel 20'. The hydraulic pressure generated by the pneumatic-hydraulic converter 50 is thus supplied, via the pressure line 128, to an intake connection 130 of the clutch valve 10. In this way, it is possible firstly to generate a pressure at the intake connection 130 of the clutch valve 10 and, following the build-up of pressure, to actuate the clutch valve 10 and thereby engage the clutch 6.

Figure 6:
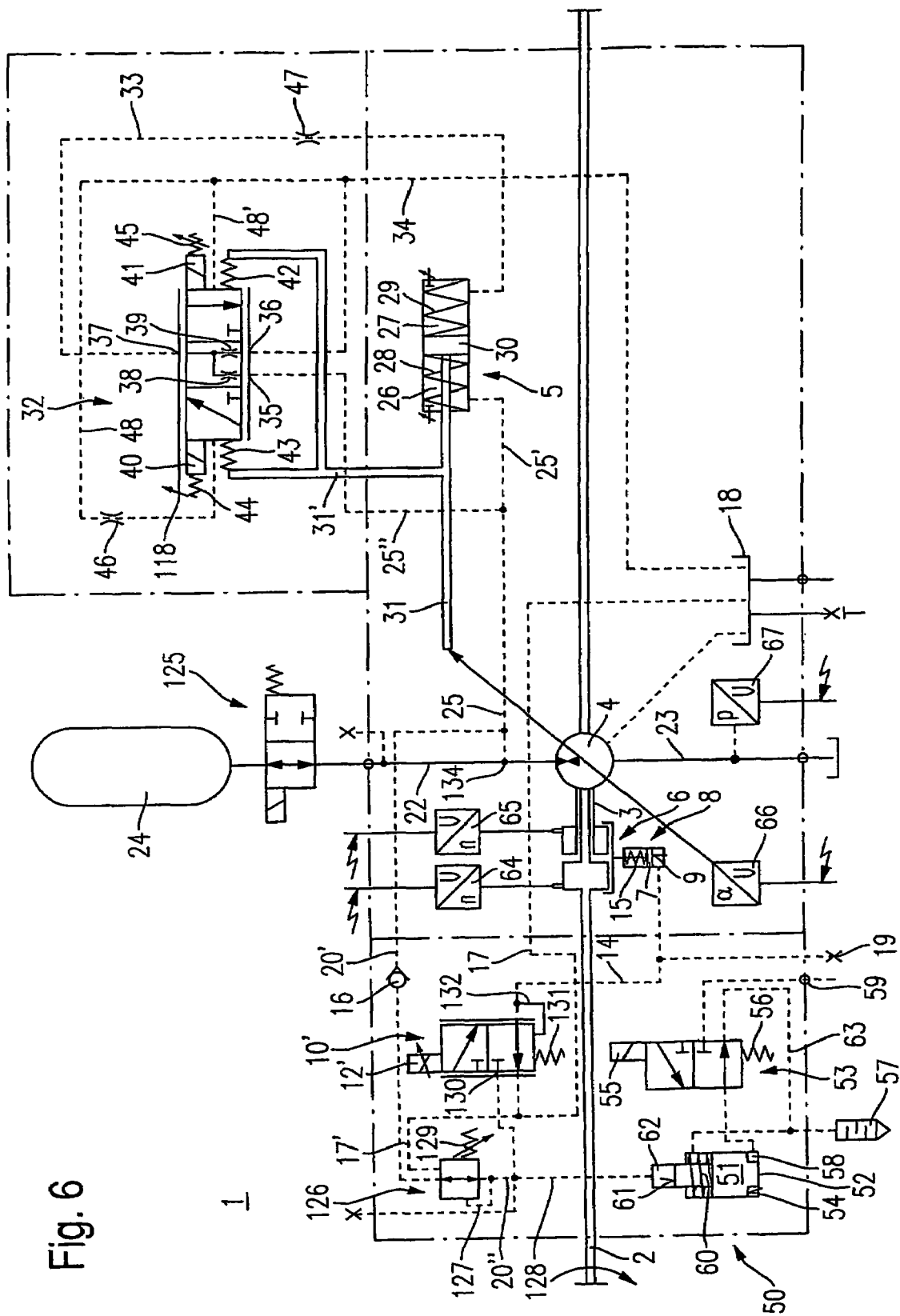
FIG. 6 shows a hydraulic circuit diagram of a third exemplary embodiment of the drive system according to the invention.

The third exemplary embodiment, which is represented in FIG. 6, proceeds from the second exemplary embodiment of FIG. 5. Here, the actuation of the clutch 6 is achieved through a clutch valve 10', which is realized as a proportional valve. The clutch valve 10' can be set to any position between its two end positions. Provided for this purpose, on the one hand, is a proportional magnet 12', which acts on the clutch valve 10' in the direction of a first operating position. The force of an adjusting spring 131 acts on the clutch valve 10' in the opposite direction, a hydraulic force likewise acting on the clutch valve 10' in the direction of the force of the adjusting spring 131. This hydraulic force is generated by the pressure prevailing in the actuating channel 14, which pressure acts on a measuring surface of the clutch valve 10', via an actuating measuring channel 132.

In the case of the exemplary embodiments of FIGS. 5 and 6, in which the hydraulic pressure generated by the pneumatic device is not supplied directly to the actuating channel 14, there is the advantage that synchronous loading of the electromagnet 12 and of the proportional magnet 12', and of the electromagnet 55 of the pneumatic valve 53, is not necessary. This is particularly advantageous in the case of the exemplary embodiment of FIG. 6, since in this way the proportional magnet 12' can be actuated independently of the electromagnet 55, with the result that sensitive engagement is possible even in the case of a purely hydraulic actuation of the clutch 6.

The invention is not limited to the represented exemplary embodiments, but also comprises any combinations of the individual features of the exemplary embodiments.

The invention claimed is:

1. Drive system having a first driving shaft and a cylinder barrel of a hydrostatic piston machine, which cylinder barrel is connected to a second driving shaft in a torsionally rigid manner, the displacement volume of the hydrostatic piston machine being able to be shifted by means of a shifting means and the first driving shaft being able to be mechanically coupled to the second driving shaft through a clutch, wherein the shifting means and the clutch can be actuated hydraulically and, for the purpose of actuation, are connected to a common control-pressure connection, wherein for the purpose of hydraulic actuation of the clutch, there is provided a clutch piston surface to which a hydraulic force can be applied, and for the purpose of applying a force to which a connection is realized between the control-pressure connection, and the clutch via a supply-line channel realized in a housing of the hydrostatic piston machine and/or a transmission housing, wherein for the purpose of actuating the clutch, a clutch valve is provided in the supply-line channel, through which clutch valve there is settable the hydraulic force acting on the clutch piston surface, and wherein a hydraulic force can be applied to the clutch piston surface through a pneumatic-hydraulic converter.

2. Drive system according to 1, wherein the control-pressure connection is realized in a connecting plate of the hydrostatic piston machine.

3. Drive system according to claim 1, wherein the clutch is disposed in a housing cover of the hydrostatic piston machine or in a transmission housing.

4. Drive system according to claim 1, wherein an actuating channel leading to the clutch piston surface is connected, via the clutch valve, to the control-pressure connection, or to a tank volume.

5. Drive system according to claim 1, wherein for the purpose of generating the hydraulic force through the pneumatic-hydraulic converter, a pneumatic force can be applied to a surface of a converter piston.

6. Drive system according to claim 5, wherein for the purpose of actuating the pneumatic-hydraulic converter, a valve is provided via which pressure can be applied to the surface of the converter piston from a pneumatic pressure source.

7. Drive system according to claim 1, wherein the hydraulic pressure generated by the pneumatic-hydraulic converter in a hydraulic volume can be supplied to the control pressure connection, of the clutch valve.

8. Drive system according to claim 1, wherein the second driving shaft is realized as a hollow shaft through which the first driving shaft extends.

9. Drive system according to claim 1, wherein the first driving shaft is a portion of a drive train of a vehicle.

10. Drive system according to claim 1, wherein the first driving shaft and the second driving shaft cooperate through a transmission stage.

11. Drive system having a first driving shaft and a cylinder barrel of a hydrostatic piston machine, which cylinder barrel is connected to a second driving shaft in a torsionally rigid manner, the displacement volume of the hydrostatic piston machine being able to be shifted by means of a shifting means and the first driving shaft being able to be mechanically coupled to the second driving shaft through a clutch, wherein the hydrostatic piston machine can be set, in its neutral position, to a minimum swivel angle, and shifting means and the clutch can be actuated hydraulically and, for the purpose of actuation, are connected to a common working-line connection, wherein for the purpose of hydraulic actuation of the clutch, there is provided a clutch piston surface to which a hydraulic force can be applied, and for the purpose of applying a force to which a connection is realized between the common working-line connection, and the clutch via a supply-line channel realized in a housing of the hydrostatic piston machine and/or a transmission housing, wherein for the purpose of actuating the clutch, a clutch valve is provided in the supply-line channel, through which clutch valve there is settable the hydraulic force acting on the clutch piston surface and wherein a hydraulic force can be applied to the clutch piston surface through a pneumatic-hydraulic converter.

12. Drive system according to claim 11, wherein the common working-line connection is realized in a connecting plate of the hydrostatic piston machine.

13. Drive system according to claim 11, wherein the clutch is disposed in a housing cover of the hydrostatic piston machine or in a transmission housing.

14. Drive system according to claim 11, wherein an actuating channel leading to the clutch piston surface is connected, via the clutch valve to the common working-line connection or to a tank volume.

15. Drive system according to claim 11, wherein for the purpose of generating the hydraulic force through the pneumatic-hydraulic converter, a pneumatic force can be applied to a surface of a converter piston.

16. Drive system according to claim 15, wherein for the purpose of actuating the pneumatic-hydraulic converter, a valve is provided via which pressure can be applied to the surface of the converter piston from a pneumatic pressure source.

17. Drive system according to claim 11, wherein the hydraulic pressure generated by the pneumatic-hydraulic converter in a hydraulic volume can be supplied to an intake connection, of the clutch valve.

18. Drive system according to claim 11, wherein the second driving shaft is realized as a hollow shaft through which the first driving shaft extends.

19. Drive system according to claim 11, wherein the first driving shaft is a portion of a drive train of a vehicle.

20. Drive system according to claim 11, wherein the first driving shaft and the second driving shaft cooperate through a transmission stage.

* * * * *